United States Patent
Krause et al.

(10) Patent No.: US 6,298,965 B1
(45) Date of Patent: Oct. 9, 2001

(54) FORCE TRANSMITTING APPARATUS HAVING AN EXTERNAL DAMPER

(75) Inventors: Thorsten Krause, Bühl (DE); Thomas Heck, Wooster, OH (US); Stephan Maienschein, Bühl; Marc Meisner, Bühl/Weitenung, both of (DE)

(73) Assignee: LuK Getriebe-Systeme GmbH, Buhl/Baden (DE)

( * ) Notice: Subject to any disclaimer, the term of this patent is extended or adjusted under 35 U.S.C. 154(b) by 0 days.

(21) Appl. No.: 09/614,051

(22) Filed: Jul. 11, 2000

Related U.S. Application Data

(62) Division of application No. 09/251,679, filed on Feb. 17, 1999, now Pat. No. 6,112,869.

(30) Foreign Application Priority Data

Feb. 17, 1998 (DE) .............................................. 198 06 463

(51) Int. Cl.⁷ ..................................................... F16D 11/06
(52) U.S. Cl. ........................ 192/3.29; 192/70.19; 192/212
(58) Field of Search ................................ 192/3.29, 3.28, 192/212, 3.3, 70.19; 464/68

(56) References Cited

U.S. PATENT DOCUMENTS

| 3,792,585 | 2/1974 | Eisenmanns et al. | |
|---|---|---|---|
| 4,926,988 | * 5/1990 | Kundermann | 192/3.3 |
| 4,966,261 | 10/1990 | Kohmo et al. | 192/3.29 |
| 5,129,493 | 7/1992 | Edmunds | 192/3.29 |
| 5,613,582 | * 3/1997 | Jackel | 192/3.29 |
| 6,112,869 | * 9/2000 | Krause et al. | 192/3.29 |

FOREIGN PATENT DOCUMENTS 42 13 341 A1   11/1992   (DE) .

* cited by examiner

*Primary Examiner*—Charles A Marmor
*Assistant Examiner*—Saúl Rodriguez
(74) *Attorney, Agent, or Firm*—Darby & Darby

(57) ABSTRACT

The invention relates to improvements in dampers which can be utilized in the power trains of motor vehicles to absorb torsional vibrations of the rotary output shaft of the engine and/or torsional vibrations of the rotary input element of a change-speed transmission normally receiving torque by way of a torque converter. One of the dampers is installed externally of the housing of the torque converter and, if used, another damper can be installed in the power flow between the piston of a lockup clutch in the housing of the torque converter and a turbine of the torque converter. The external damper can include an energy storing component and a friction generating component which latter is or can be sealed from the energy storing component.

34 Claims, 8 Drawing Sheets

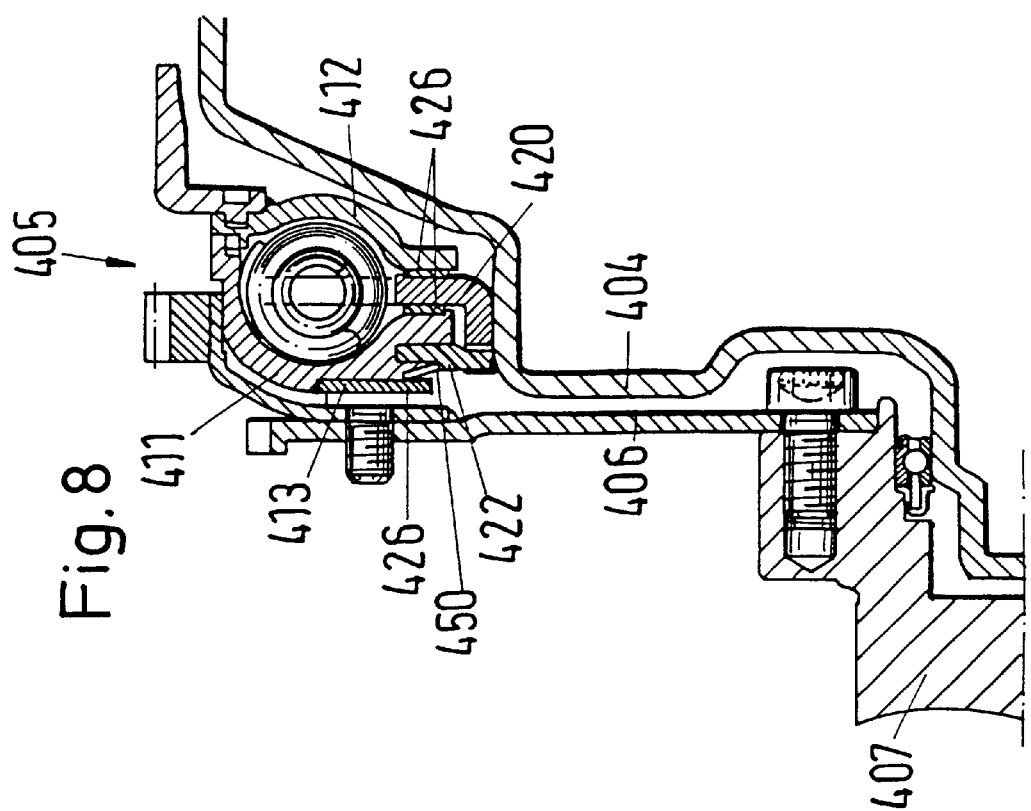
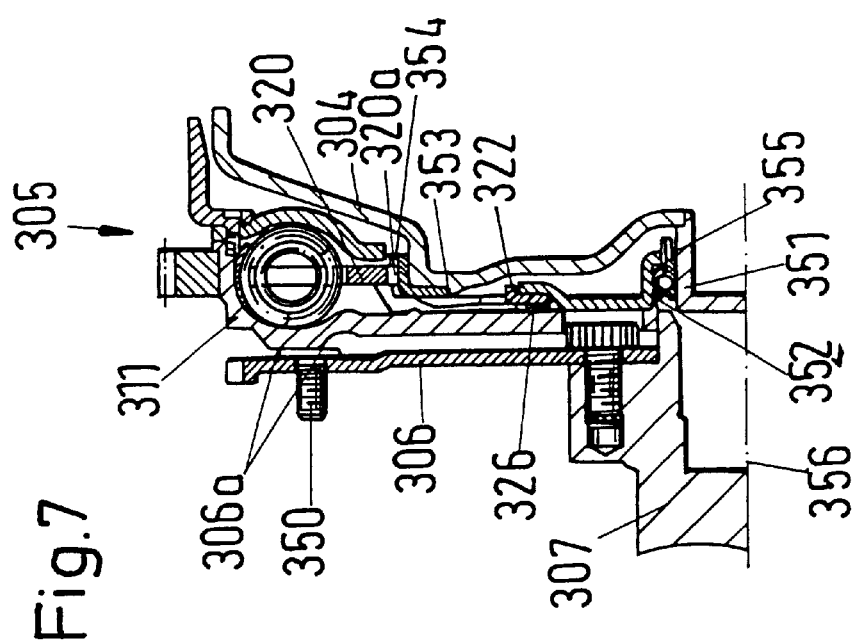

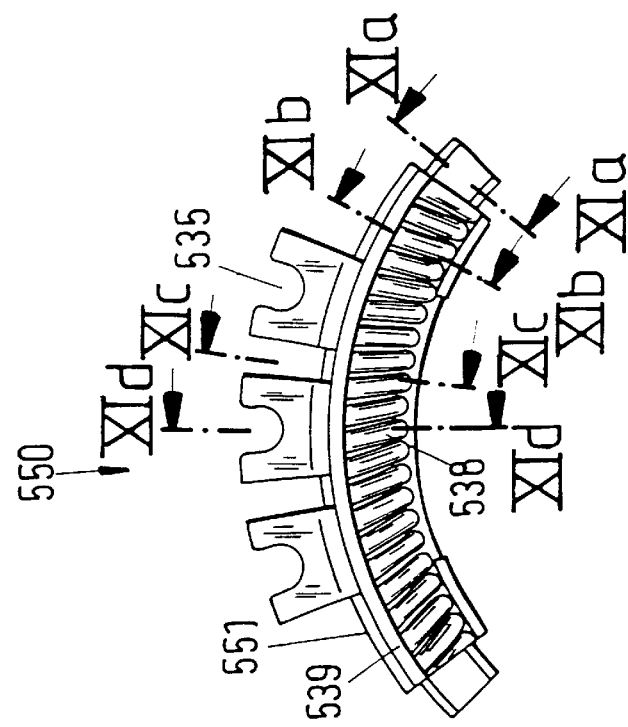
Fig. 10
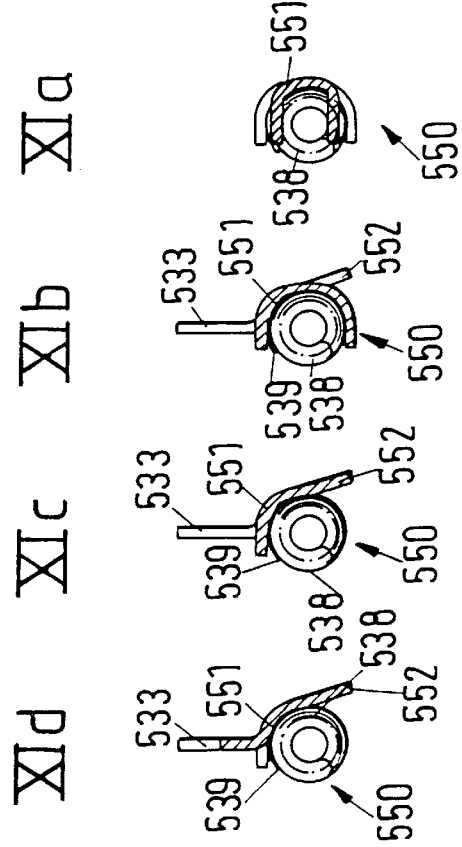
Fig. 11
Fig.11a  Fig.11b  Fig.11c  Fig.11d

FORCE TRANSMITTING APPARATUS HAVING AN EXTERNAL DAMPER

This is a division, of application Ser. No. 09/251,679, filed Feb. 17,1999, now issued as U.S. Pat. No. 6,112,869. Each of these prior applications is hereby incorporated herein by reference, in its entirety.

BACKGROUND THE INVENTION

The invention relates to improvements in force transmitting apparatus, and more particularly to improvements in force transmitting apparatus which employ torque converters. Still more particularly, the invention relates to improvements in force transmitting apparatus wherein the transmission of forces between the rotary output element of a prime mover and the rotary output assembly of the torque converter takes place by way of at least one damper which serves to absorb at least a certain percentage of torsional vibrations, i.e., which opposes the transmission of such torsional vibrations from the prime mover to the system which normally receives torque from the torque converter and/or in the opposite direction. Apparatus of the type to which the present invention pertains can be utilized in the power trains of motor vehicles to transmit torque between the output element (such as a crankshaft or a camshaft) of the internal combustion engine or another prime mover and the input shaft of a change speed transmission.

Force transmitting apparatus of the above outlined character are disclosed, for example, in published German patent application Ser. No. 42 13 341.

A drawback of presently known force transmitting apparatus of the above outlined character is that their torsional vibration damping action does not always and/or sufficiently conform to the requirements under certain specific circumstances in actual use. More specifically, the ability of conventional force transmitting apparatus to absorb torsional vibrations does not invariably and/or adequately reflect the characteristics of the prime mover (such as an internal combustion engine) and/or the characteristics of the aggregate or aggregates which normally receives or receive torque from the torque converter.

OBJECTS OF THE INVENTION

An object of the present invention is to provide a force transmitting apparatus wherein the torsional vibrations damping unit or units is or are designed in such a way that its or their torsional vibrations damping action more accurately and more satisfactorily reflects the characteristics of the torque transmitting and torque receiving units.

Another object of the invention is to provide an apparatus which can reliably and predictably transmit pronounced torques.

A further object of the invention is to provide an apparatus which can be readily combined with existing torque converters in a space-saving manner.

An additional object of the invention is to provide a wear-resistant and relatively simple and inexpensive apparatus which can stand long periods of extensive use, e.g., in the power trains or motor vehicles.

Still another object of the invention is to provide a novel and improved combination of one or more torsional vibration dampers and a hydrokinetic torque converter or a Föttinger transmission or coupling for use in the above outlined apparatus.

An additional object of the invention is to provide the above outlined apparatus with novel and improved torsional vibration dampers which are readily accessible for the purposes of inspection, repair, adjustment or replacement.

A further object of the invention is to provide a novel and improved torque converter for use in the above outlined apparatus.

Another object of the invention is to provide a novel and improved turbine damper for use in the above outlined force transmitting apparatus.

An additional object of the invention is to provide novel and improved combinations of energy storing and friction generating components for use in the torsional vibration dampers of the above outlined force transmitting apparatus.

Still another object of the invention is to provide a novel and improved method of damping torsional vibrations between the rotary output element of a prime mover and the rotary input element of a transmission in the power train of a motor vehicle.

A further object of the invention is to provide a power train which can be utilized in a motor vehicle and embodies a force transmitting apparatus of the above outlined character.

Another object of the invention is to provide a simple, compact, reliable and long-lasting combination of an internal combustion engine, a torque converter, a change-speed transmission and one or more torsional vibration dampers which can damp or prevent the transmission of torsional vibrations from the engine to the transmission as well as in the opposite direction.

SUMMARY OF THE INVENTION

One feature of the present invention resides in the provision of a force transmitting apparatus which comprises a fluid-containing housing rotatable about a predetermined axis, a pump which is disposed in and is rotatable with the housing, a turbine which is coaxial with and is disposed in and is rotatable relative to the housing, a rotary output assembly which is coaxial with and connectable to the turbine, a prime mover having a rotary torque transmitting arrangement for the housing, and a damper which is interposed between the torque transmitting arrangement and the output assembly and is located outside of the housing.

The housing, the turbine, the pump and the output assembly can form part of a Föttinger clutch or of a hydrokinetic torque converter. The torque converter can further comprise one or more stators installed in the housing between the pump and the turbine.

The external damper can comprise at least one energy storing component, at least one (wet or dry) friction generating component, and means for separating the energy storing and friction generating components from each other. Such separating means can define a chamber for the at least one energy storing component; to this end, the separating means can comprise at least one carrier bounding a portion of the chamber, and a collar or flange which is secured to a wall of the housing and includes portions extending into the chamber. Such separating means can further comprise a form-locking connection between the collar and the wall. The damper can further comprise at least one seal interposed between those portions of the collar which extend into the chamber and the carrier. The at least one seal can comprise a membrane and/or a sealing ring, and such seal can be made of a plastic material, an elastomeric material, a metallic material or a composite of two or all three of the just enumerated materials. The seal or seals can be corrugated; such seal or seals can be provided with one or more sealing lips, and each seal can but need not extend at least substantially radially of the axis of the housing for the turbine and the pump.

The carrier and the collar can have a limited freedom of movement relative to each other in at least one of two directions including radially and axially of the housing, and the at least one seal can be arranged to seal the chamber between the carrier and the collar irrespective of such limited freedom of movement of the carrier and the collar relative to each other.

The damper can further comprise an annular member which is or which can be fixedly secured to the carrier; the collar and/or the annular member can carry or embody means for centering the external damper on a shaft of the rotary torque transmitting arrangement (such shaft can constitute the output shaft (such as a camshaft or a crankshaft) of an internal combustion engine in the power train of a motor vehicle). Alternatively, the torque transmitting arrangement can include a centering member which is coaxial with the housing of the Föttinger clutch or the hydrokinetic torque converter, and the collar and/or the annular member can be provided with means for centering the damper on the centering member of the torque transmitting arrangement.

Alternatively, the damper can be centered on the aforementioned carrier by a centering means which consists of a metallic sheet material.

The aforementioned wall of the housing for the pump and the turbine can be provided with an annular (particularly cylindrical) external surface, and at least the energy storing means of the at least one energy storing component can be mounted to surround the external surface of such wall. A second damper (hereinafter called turbine damper to distinguish from the aforediscussed external damper) can be interposed between the turbine and the output assembly of the force transmitting apparatus, and the external damper is preferably disposed radially outwardly of the turbine damper. The latter can be coaxial with the external damper. The housing can be provided with fastener means for securing the external damper to the housing at the peripheral surface of the wall.

The chamber for the at least one component of the external damper can contain a medium, other than air, which at least partially fills that portion of the chamber which is not occupied by the at least one energy storing component of the external damper. The medium can have a liquid or a greasy consistency. For example, the medium can contain oil and/or grease.

The force transmitting apparatus can further comprise means for adjusting the at least one friction generating component of the external damper. To this end, the at least one friction generating component can include a first section which is rotatable with the housing and a second section which is rotatable with and relative to the first section. The second section is rotatable relative to the first section (preferably clockwise and counterclockwise from a neutral or starting position) through an angle of at least about 2°, preferably through an angle between about 20 or 30 and about 15°.

The first section of the at least one friction generating component can be affixed to the wall of the housing, and the adjusting means can comprise a first gear on the wall and an internal gear mating with the first gear and provided on a friction disc of the second section (such friction disc forms part of the at least one energy storing component as well as of the at least one friction generating component). The gears of the adjusting means should mate with a predetermined play, as seen in the circumferential direction of the external damper.

The at least one energy storing component can include a collar which is carried by the wall of the housing, and the first gear of the adjusting means can form part of such collar.

The first gear can have at least one tooth extending axially or radially of the housing and mating with teeth forming part of the internal gear with a predetermined play (again as seen in the circumferential direction of the external damper).

The first section of the adjusting means can include a collar which is carried by the wall of the housing and has at least one window. Such adjusting means can comprise a gear which is provided on the second section of the adjusting means and has a tooth extending into the window with a play as seen in the circumferential direction of the the damper. Thus, the at least one window can be said to constitute a tooth space between two teeth of the collar.

If the first section of the adjusting means is provided on the wall of the housing, the adjusting means can comprise a spur gear on such first section. The at least one energy storing component of the external clutch embodying such adjusting means can comprise at least one resilient element and a collar which engages the at least one resilient element and constitutes the second section of the adjusting means in that it is provided with an internal gear mating, with a predetermined play, as seen in the circumferential direction of the external damper, with the spur gear on the wall of the housing.

Another feature of the invention resides in the provision of a force transmitting apparatus which comprises a torque converter including at least one fluid-containing housing which is rotatable about a predetermined axis, a pump which is disposed in and is rotatable with the at least one housing, and a turbine disposed in and rotatable with as well as relative to the at least one housing. The apparatus further comprises a rotary torque transmitting arrangement for the at least one housing, a rotary output assembly which is coaxial with the at least one housing and is arranged to receive torque from the turbine, at least one damper provided in a power flow between the torque transmitting arrangement and the output assembly, and a lockup clutch provided in the at least one housing and being engageable to transmit torque between a wall of the at least one housing and the turbine. The wall of the at least one housing has at least one first protuberance extending in the direction of the predetermined axis, and the lockup clutch comprises a piston which is movable in the direction of the aforementioned axis to engage and disengage the clutch. The piston has at least one second protuberance which form-lockingly engages the at least one first protuberance.

At least one of the first and second protuberances is or can be provided with a recess which receives at least a portion of the other of the first and second protuberances.

In accordance with one presently preferred embodiment, the wall has a first annulus of circumferentially spaced apart first protuberances and the piston has a second annulus of circumferentially spaced apart second protuberances mating with the first protuberances of the first annulus. The mating can be effected by causing at least some of the first protuberances to extend into the adjacent second protuberances and/or vice versa, or by causing the first protuberances to mesh with the second protuberances not unlike the teeth of two coaxial gears. The protuberances can be hollow and can extend in the direction of the axis of the at least one housing from an imaginary plane which is normal to such axis.

The protuberances can consist of a first material and their confronting surfaces can be provided with coats of a second material other than the first material. The second material can be a suitable sound-absorbent material such as a polymer or a lacquer.

The at least one first protuberance can constitute a cold-formed portion of the wall of the at least one housing.

The piston is movable in the direction of the axis of the at least one housing between first and second positions in which the lockup clutch is respectively engaged and disengaged, and the lockup clutch preferably further comprises means for yieldably biasing the piston to its second position. The biasing means can comprise at least one resilient element which reacts against the wall of the at least one housing and bears against the piston. The wall can include a hub, and a presently preferred embodiment of the biasing means comprises an annular retainer (e.g., a split ring) which is carried by the aforementioned hub of the wall and a diaphragm spring which reacts against the retainer and bears against the piston.

A further feature of the invention resides in the provision of a force transmitting apparatus which comprises a fluid-operated torque converter including at least one housing which is rotatable about a predetermined axis, a pump which is disposed in and is rotatable with the at least one housing, and a turbine which is also disposed in the at least one housing and is rotatable with as well as relative to the at least one housing. The apparatus further comprises a rotary torque transmitting arrangement for the torque converter, a rotary output assembly which is arranged to normally receive torque from the turbine, and a damper which is interposed between a wall of the at least one housing and the turbine. The damper includes a plurality of resilient elements and receptacles (e.g., in the form of shells or tubes) for the resilient elements. The receptacles are provided on the turbine.

The receptacles can be welded and/or riveted to the turbine, and the damper can further comprise wear-resistant liners provided in the receptacles to at least reduce the extent of contact between the resilient elements and the respective receptacles. The liners can have surface-hardened portions which confront the respective resilient elements, or the entire liners can consist of a hardened highly wear-resistant material.

The apparatus can further comprise an engageable and disengageable lockup clutch which operates between the wall of the at least one housing and the damper. The lockup clutch can include a piston which is movable in the direction of the predetermined axis, and the receptacles can include portions (e.g., in the form of lugs) which are affixed to the piston. A second set of lugs on the receptacles can be affixed (e.g., welded or riveted) to the turbine.

The turbine can comprise a hub which is arranged to transmit torque between the turbine and the output assembly, and the hub can include or carry an input member which is arranged to stress the resilient elements (such as coil springs) of the damper. The output assembly can include a shaft (e.g., a shaft which constitutes the input shaft of the change-speed transmission in the power train of a motor vehicle), and the hub of the turbine can be non-rotatably mounted on such shaft.

The turbine includes an intermediate portion having a maximum length in the axial direction of the at least one housing (such intermediate portion can be located midway or approximately midway between maximum-and minimum-diameter portions of the turbine), and the receptacles can be provided on a portion of the turbine other than the intermediate portion of maximum axial length, i.e., nearer to the maximum-diameter or to the minimum-diameter portion of the turbine.

Still another feature of the invention resides in the provision of a force transmitting apparatus which comprises a fluid-operated torque converter including at least one housing which is rotatable about a predetermined axis, a pump which is disposed in and is rotatable with the at least one housing, and a turbine which is disposed in and is rotatable with as well as relative to the at least one housing. The apparatus further comprises a rotary torque transmitting arrangement for the torque converter, a rotary output assembly which is arranged to normally receive torque from the turbine, a lockup clutch disposed between the at least one housing and the turbine and including a piston movable relative to the at least one housing in the direction of the predetermined axis to engage and disengage the clutch, and damper means in a power flow between the torque transmitting arrangement and the output assembly. The damper means includes a turbine damper which is operative between the turbine and the output assembly and has at least one energy storing element, means for stressing the at least one energy storing element in response to angular displacement between the turbine damper and the output assembly (such stressing means can comprise input and output members which are rotatable with and relative to each other), fastener means for rotatably connecting the input and output members to each other, a safety member for the fastener means, and a spring which is connected with the safety member and serves to oppose at least some movements of the piston relative to the at least one housing.

The spring can include or constitute a diaphragm spring, and the safety member can include a substantially circular disc which is surrounded by the spring. The disc can include portions which are connected to the spring; such portions can be made of a resilient material and can be arranged to bias the spring in the axial direction of the at least one housing. The just mentioned portions of the disc can include parts which extend in a circumferential direction of the spring to ensure that the spring and the disc can move relative to each other through a distance which is desirable or necessary to ensure that the spring can yieldably oppose predetermined axial movements of the piston.

The torque converter can constitute a hydrokinetic torque converter which can comprise one or more stators installed in the at least one housing between the turbine and the pump, or a Föttinger coupling without a stator.

The novel features which are considered as characteristic of the invention are set forth in particular in the appended claims. The improved force transmitting apparatus itself, however, both as to its construction and its mode of operation, together with numerous additional important and advantageous features and attributes thereof, will be best understood upon perusal of the following detailed description of certain presently preferred specific embodiments with reference to the accompanying drawings.

BRIEF DESCRIPTION OF THE DRAWINGS

FIG. 7 is a view similar to that of FIG. 5 or 6 but showing another external damper;

FIG. 8 is a view similar to that of FIG. 5, 6 or 7 but showing still another external damper;

FIG. 10 is a fragmentary sectional view of a detail in the turbine damper of FIG. 9;

FIG. 11a is a sectional view as seen in the direction of arrows from the line XIa—XIa in FIG. 10;

FIG. 11b is a sectional view as seen in the direction of arrows from the line XIb—XIb in FIG. 10;

FIG. 11c is a sectional view as seen in the direction of arrows from the line XIc—XIc in FIG. 10;

FIG. 11d is a sectional view as seen in the direction of arrows from the line XId—XId in FIG. 10.

DESCRIPTION OF PREFERRED EMBODIMENTS

Figure 1:
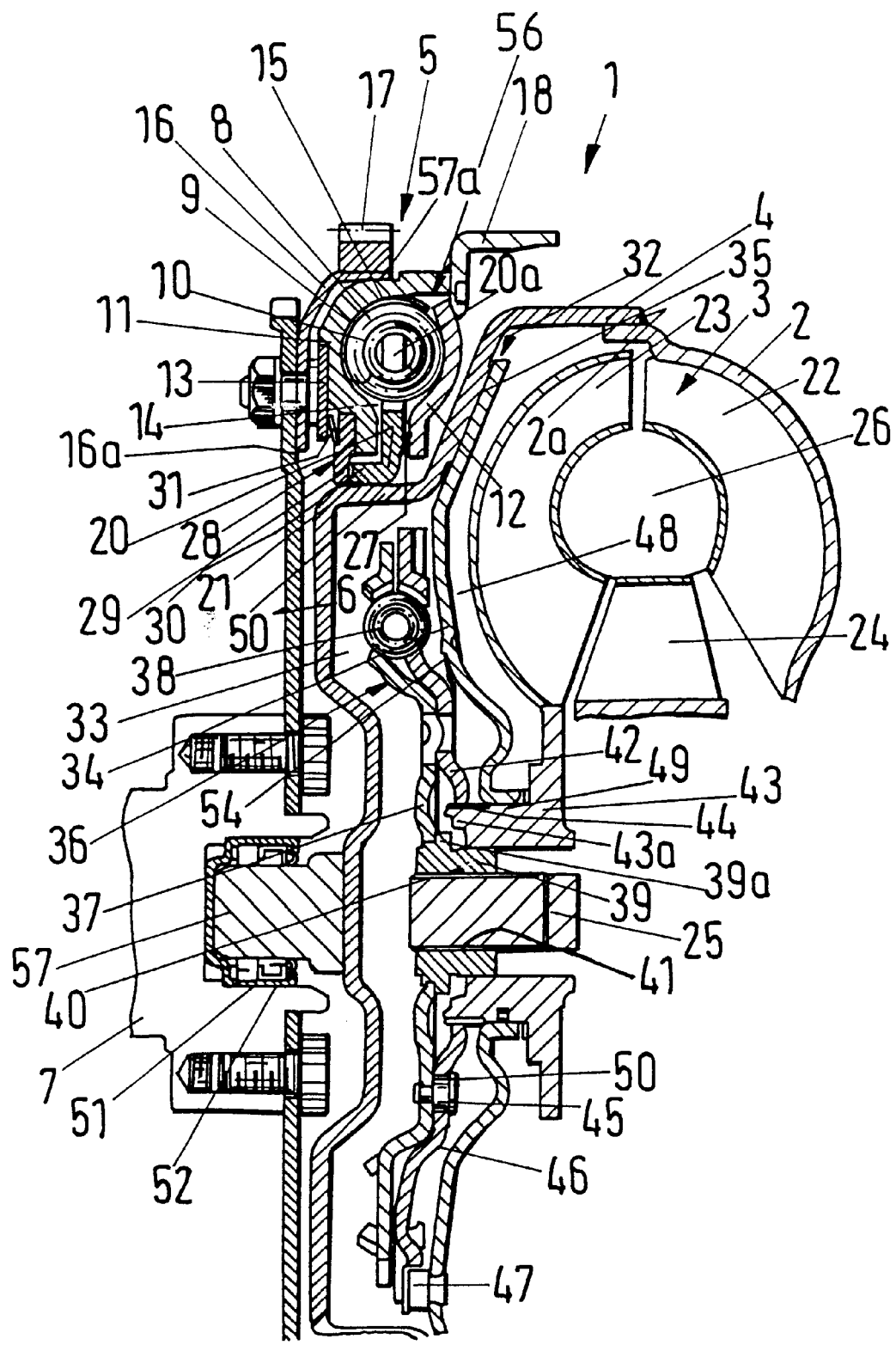
FIG. 1 is a fragmentary axial sectional view of a force transmitting apparatus which employs a hydrokinetic torque converter, an external damper in the power flow between the rotary output element of the prime mover and the rotary input element of a change-speed transmission in the power train of a motor vehicle, and a second damper associated with the turbine of the torque converter.

Referring to FIG. 1, there is shown a force transmitting apparatus 1 which is installed between the rotary output element 7 (e.g., a camshaft or a crank-shaft) of a prime mover (such as an internal combustion engine in the power train of a motor vehicle) and the rotary input element 25 of a normally driven aggregate (such as a variable-speed transmission in the power train of the motor vehicle). The apparatus 1 comprises a hydrokinetic or hydrodynamic torque converter 3 having a rotary housing 2 with a rear wall 4 which confronts the prime mover and receives torque from the output element 7 by way of a radially extending flexible plate-like torque transmitting member 6 and a novel and improved damper 5. In accordance with a feature of the invention, the damper 5 is located outside of the housing 2 of the torque converter 3. The wall 4 includes an annular radially outer portion which is affixed (e.g., welded, as at 2a) to the other part of the housing 2.

The purpose of the external damper 5 is to absorb or suppress at least some torsional vibrations of the torque transmitting arrangement including the output element 7 and the flexible plate-like member 6. To this end, the damper 5 comprises an energy storing component 8 including at least two interfitted compression coil springs 9 and 10. In accordance with a presently preferred embodiment, each of the coil springs 9, 10 extends along an arc of at least 180°. It is advisable, and normally preferred, to impart to the springs 9, 10 a desired curvature (or a curvature at least approaching the desired or required curvature) prior to confinement of such springs in an annular chamber 14 of the damper 5. Such advance deformation of the coil springs 9 and 10 simplifies the assembly of the damper 5 and of the entire force transmitting apparatus 1.

The illustrated resilient energy storing component 8 including the interfitted coil springs 9, 10 can be replaced with an arrangement employing a single arcuate helical coil spring. Furthermore, the energy storing arrangement can employ resilient elements other than coil springs (e.g., one or more blocks of elastomeric material) or combinations of two or more different types of energy storing elements. Still further, the illustrated arrangement 8 can be replaced with a set of springs (such as coil springs) which are disposed end-to-end, i.e., which need not be (or all of which need not be) fitted into each other.

When a bypass or lockup clutch 32 of the apparatus ratus 1 is engaged to transmit torque from the rear wall 4 of the housing 2 directly to the input element 25 of the transmission, i.e., to bypass the pump 22 and the turbine 23 of the torque converter 3, the external damper 5 can serve the additional function of absorbing or counteracting torsional vibrations of the input element 25, i.e., of the rotary output assembly of the apparatus 1.

The damper 5 further comprises a composite casing, receptacle or enclosure for the coil springs 9 and 10. Such receptacle includes two toroidal shells or carriers 11, 12 which define at least a major portion of the aforementioned chamber 14 for the energy storing component 8. In the absence of any undertaking to the contrary, the component 8 (and more specifically the larger-diameter coil spring 9) would abut directly the internal surfaces of the carriers 11, 12, at least when the springs 9 and 10 are being acted upon by centrifugal force. The radially outer portions of the carriers 11, 12 are sealingly secured to each other by a welded seam 56 and have internal pockets or shoulders serving as abutments for the end convolutions of at least one of the coil springs 9, 10. The end convolutions of these coil springs further bear upon the radially outwardly extending lugs 20a of an annular collar or flange 20 which is carried by the wall 4 of the housing 2. The carriers 11, 12 normally receive torque from the flexible member 6 of the torque transmitting arrangement further including the output shaft 7, and the collar or flange 20 can transmit torque to the housing 2 when the motor vehicle is in the process of pulling a load (as contrasted with coasting).

The reference character 13 denotes a plate-like abutment member which is affixed to the member 6 by threaded fasteners (or by rivets or by a welded seam) and is further affixed to the carrier 11 which cooperates with the carrier 12 to rotate the collar 20 by way of the coil springs 9, 10.

The chamber 14 for the springs 9, 10 is at least partially filled with a flowable medium other than air, preferably by a lubricant having a liquid consistency (such as oil) or a pasty consistency (such as grease). The purpose of the body of lubricant in the chamber 14 is to prolong the useful life of the damper 5 by reducing wear upon the coil springs 9 and 10.

The carriers 11 and 12 can be shaped bodies of sheet metal made in a suitable cold forming machine. Each of these carriers can define approximately one-half of the annular chamber 14 for the coil springs 9 and 10.

The composite receptacle 11, 12 defining the chamber 14 can be replaced with a one-piece receptacle which defines the aforementioned internal pockets or shoulders serving as abutments for the end convolutions of the coil springs 9, 10 constituting the energy storing component 8 of the damper 5.

FIG. 1 further shows a wear-resistant liner 15 which is surrounded by the radially outer portion of the internal surface of the receptacle including the carriers 11, 12 to be contacted by the radially outer-most portions of convolutions of the larger-diameter coil spring 9. The liner 15 can have a hardened internal surface, or it can be made of hardened steel or another suitable highly wear-resistant material. By resorting to the liner 15, one can achieve pronounced savings in that the carriers 11, 12 need not be made of a highly wear-resistant material.

The chamber 14 is at least substantially sealed from the surrounding atmosphere by sealing means 27 which is installed between the collar 20 and the receptacle 11, 12 to prevent the medium in the chamber 14 from contacting a friction generating component 28 of the damper 5. The sealing means 27 constitutes or forms part of the means for separating the energy storing component 8 and the friction generating component 28 from each other. The illustrated friction generating component 28 of the damper 5 is a dry friction generating component and, therefore, it should not be contacted by the viscous material at least partially filling that portion of the chamber 14 which is not occupied by the energy storing component 8.

The friction generating component 28 of the damper 5 comprises a friction disc 29 which forms part of an adjusting or regulating unit of the damper. To this end, the friction disc 29 has an annular gear 30 with one or more teeth mating (with clockwise as well as counterclockwise play) with two or more teeth of an annular gear 20b on the collar 20. The teeth of the gears 20b, 30 mate in a plane which is normal to the axis of the torque converter 3. The play between the teeth of the gear 20b and the tooth or teeth of the gear on the friction disc 29 (to either side of a neutral position) can be in the range of between about 2° and 15°. The friction disc 29 is installed between the plate-like abutment member 13 and the carrier 11 and is biased against the member 13 by a diaphragm spring 31 which reacts against the carrier 11. The characteristic of the spring 31 determines the magnitude of friction between the parts 13 and 31. This spring extends in part into a recess which is provided therefor in the friction disc 29.

In accordance with a modification, the member 13 can be provided with a friction surface which is contacted by a modified friction disc; the latter is biased by the diaphragm spring 31 or an equivalent spring which rects against the carrier 11. The modified friction disc can be a mirror image of the friction disc 29.

The damper 5 is centered on the output shaft 7 by a centering means 57a which operates between the carrier 11 of the damper and a holder 16; the latter is form-lockingly affixed to the plate-like member 6 by spot welding (at 16a) and/or by rivets (not shown). The member 6 centers the damper 5 on the output shaft 7 of the engine.

The torque converter 3 is centered on the torque transmitting arrangement 6, 7 by a stub or stud 57 which extends from the central portion of the wall 4 and is received in a socket 52 of the shaft 7. The stub 57 can form part of, or it can be welded, riveted, bolted or screwed to, the wall 4.

An antifriction (e.g., roller or ball) bearing 51 is installed between the stub 57 and the internal surface in the socket 52 of the output shaft 7.

In accordance with a feature of the invention, an intermediate annular portion of the wall 4 is suitably deformed or shaped to provide a cylindrical or substantially cylindrical axially extending external surface 50 which is surrounded by the damper 5. The axial length of the surface 50 is or can be selected in such a way that the damper 5 need not extend, or extends only slightly, beyond the central portion of the wall 4. In other words, the configuration of the wall 4 can be such that the damper 5 need not contribute to axial length of the force transmitting apparatus 1. The provision of the external surface 50 merely entails a reduction of the internal chamber or space 48 for the torque converter 3, i.e., of that space which receives the pump 22, the turbine 23 and the (optional) stator(s) 24 of the torque converter 3.

That portion of the wall 4 which extends radially outwardly beyond he external surface 50 has a frustoconical shape which conforms, more or less, to the toroidal outline of the adjacent side of the turbine 23.

The aforementioned bypass or lockup clutch 32 is installed in the internal chamber 48 and operates between the frustoconical portion of the wall 4 and the turbine 23. The clutch 32 comprises an axially movable piston 34 which constitutes the frustum of a hollow cone because such configuration contributes to a more satisfactory distribution of forces acting between the piston 34 and the adjacent portion of the wall 4 when the clutch 32 is engaged to transmit torque from the housing 2 to the input shaft 25 of the transmission by way of the turbine 23 rather than by way of the housing 2, pump 22, fluid 26 in the internal chamber 48 and the turbine 23. The piston 34 and/or the adjacent inner side of the frustoconical portion of the wall 4 is provided with customary friction linings 35 which can have suitably distributed grooves or channels or passages for the circulation of a coolant in a manner well known from the art of bypass or lockup clutches.

The piston 34 can be replaced with a piston which extends exactly radially of the axis of the torque converter 3, and the adjacent conical portion of the wall 4 is then replaced with a flat or substantially flat disc-shaped portion.

The holder 16 has an outer side which carries the customary starter gear 17. The latter surrounds the radially outer portion of the carrier 11. The carrier 12 supports an optional flywheel 18 which can be welded or riveted or otherwise secured thereto.

The flow of power from the coil springs 9, 10 of the energy storing component 8 toward the wall 4 takes place by way of the collar 20 which has an L-shaped cross-sectional outline and is welded (at 21) to the wall 4. In accordance with a presently preferred embodiment, the collar 20 is configurated and mounted in such a way that its axially extending cylindrical or tubular portion 20a' extends away from the lockup clutch 32 and the internal chamber 48 of the torque converter 3. This entails savings in space and renders it possible to provide the cylindrical portion 20a' of the collar 20 with the aforementioned gear 20b.

When the lockup clutch 32 is disengaged, the flow of power from the shaft 7 to the shaft 25 by way of the energy storing component 8 of the damper 5 is via housing 2, pump 22 (which can be of one piece with the right-hand portion of the housing 2, as viewed in FIG. 1), the liquid 26 in the internal chamber 48, and the turbine 23. When the RPM of the output shaft 7 is relatively low, the stator 24 (if used in the torque converter 3) can serve as a torque amplifying means in that it transmits torque to the case of the transmission including the input shaft 25 by way of a freewheel FL.

The turbine 23 non-rotatably surrounds a hub 43 which is also non-rotatably connected to the piston 34 of the lockup clutch 32 in such a way that the piston 34 can move axially toward and away from the adjacent frustoconical portion of the wall 4. Still further, the hub 43 is non-rotatably connected to an input member 42 of the turbine damper 36. To this end, the hub 43 has an axial extension with an external gear 44 which is axially movably but non-rotatably surrounded by the member 42. The member 42 has limited freedom of angular movement on the extension (gear 44) of the hub 43. Such freedom or play determines the operating range of the turbine damper 36.

An output member 37 of the turbine damper 36 is non-rotatably affixed to the extension 39a of the hub 39. The connection between the member 37 of the turbine damper 36 and the hub 43 (gear 44) can include a set of welded spots 37a, mating internal and external gears, rivets or the like. The extension 39a on the hub 39 limits the extent of axial movability of the parts 39, 43 relative to each other.

The hub 39 is located radially inwardly of the hub 43 and can move the output member 37 of the turbine clutch 36 axially to thus equalize the extent of axial movement of the piston 34 during engagement and disengagement of the lockup clutch 32.

The lockup clutch 32 serves to enhance the efficiency of the force transmitting apparatus 1 in that it can be engaged to an extent which is necessary to rotate the shaft 7 by the shaft 25 without slip. The clutch 32 is engaged in response to an increase of fluid pressure in the chamber 33 (at one side of the piston 34) relative to the fluid pressure in the internal chamber 48 of the torque converter 3. Such slippage-free transmission of force takes place from the shaft 25 to the wall 4 and, by way of the external damper 5 and plate-like member 6, to the shaft 7.

The turbine damper 36 serves to damp additional torsional vibrations and operates between the turbine 23 and the input shaft 25 of the transmission. For example, the damper 36 can counteract (absorb) torsional vibrations which are attributable to the turbine 23 and/or to the parts connected between the turbine and the shaft 25. The output member or component 37 cooperates with an energy storing component 38 which is part of the damper 36 and is or can be a functional equivalent of the energy storing component 8 of the external damper 5. The output member 37 non-rotatably surrounds the hub 39 which has internal teeth 40 mating with the external teeth 41 of the input shaft 25. The connection 37a between the output member 37 and the hub 39 can include mating teeth of two gears, or it can constitute a more or less permanent connection (such as by welding). The aforementioned extension or stop 39a serves to limit the extent of axial movability, or to set the axial position, of the hub 39.

The input member 42 of the turbine damper 36 surrounds the hub 43 which is rotatable on the hub 39, and the member 42 has the gear 44 which can transmit torque to but has limited freedom of angular movability relative to the hub 43.

The input and output members 42, 37 are angularly movably connected to each other by the bolts (or other suitable fasteners) 45 and are normally held against angular movement relative to one another by the safety disc 46, e.g., a safety disc of the type shown in and to be described in detail with reference to FIG. 12. The hub 43 is non-rotatably secured to the input member 42 by the rivets 47.

In order to enable the piston 34 of the lockup clutch 32 to move axially toward and away from the adjacent portion of the wall 4 (i.e., to engage or disengage the lockup clutch), the piston 34 and the input member 42 are movable longitudinally of the hub 43 relative to the output member 37 which is carried by the part 39a of the hub 39. The latter is shiftable along the input shaft 25. The gear 44 of the hub 43 surrounds the gear on the extension 43a. When the lockup clutch 37 is disengaged, the hub 39 extends to a greater extent into the tubular hub 43 to thus reduce the axial length of the apparatus 1. A sealing ring 49 is installed between the piston 34 and the hub 43.

Axial movements of the turbine damper 36 relative to the piston 34 are damped by the safety disc 46.

The carriers 11, 12 can be said to constitute a flywheel having a mass which is added to the mass of the flywheel 18. The latter can be omitted if the mass of the carriers 11, 12 suffices to ensure that the inertia of the damper 5 meets the requirements in actual use of the force transmiting apparatus 1.

The holder 16 and the fastener means connecting it to the flexible plate 6 of the rotary torque transmitting arrangement further including the output shaft 7 can be omitted if the plate 6 is affixed directly to the receptacle including or replacing the carriers 11 and 12.

An advantage of the energy storing component 8 is that its coil springs 9, 10 (or a set of springs which are disposed end-to-end rather than within each other) can take up a considerable amount of space. This, in turn, renders it possible to utilize springs having a rather low spring rate or spring gradient so that the springs permit extensive angular movements of the receptacle (carriers 11, 12) and the collar or flange 20 relative to each other, i.e., extensive angular displacements of the input and output members of the damper 5 relative to one another. The flange or collar 20 rotates with the housing 2, and the carriers 11, 12 rotate with the output shaft 7, i.e., the resilient energy storing component 8 of the external damper 5 can absorb torsional vibrations of the shaft 7 and/or of the housing 2.

In addition to, or in lieu of (or in admixture to) oil and/or grease, the chamber 14 can contain automatic transmission fluid (ATF). The viscosity of the flowable substance in the chamber 14 can be so pronounced that the sealing means 27 can be omitted or that, if utilized, the sealing means serves primarily as an expedient which prevents the penetration of contaminants into the chamber 14. As a rule, or at least in many instances (and assuming that the chamber 14 contains a high-viscosity oil, grease or the like), the sealing means 27 will perform the important function of preventing the fluid which is confined in the chamber 14 from reaching and adversely influencing the operation of the preferably dry friction generating component 28 of the damper 5. Reliable sealing action for the chamber 14 is desirable on the additional ground that, by preventing the escape of lubricant from the chamber 14, one ensures that the servicing and/or inspection of the damper 5 is not needed at all or must be carried out at infrequent intervals.

The exact nature and complexity of the sealing means 27 for the chamber 14 depend upon the desired sealing action, on the composition of the fluid in the chamber 14 and/or on certain other factors. The sealing means can comprise one or more sealing rings and/or one or more sealing diaphragms of a metallic, elastomeric, plastic and/or other suitable material. The surfaces of the sealing means 27 can be smooth, corrugated and/or otherwise shaped to enhance the sealing action between the interior of the chamber 14 and the surrounding atmosphere. For example, a single sealing device or at least one of several sealing devices can be provided with one or more sealing lips or similar configurations which even further enhance the sealing action.

As will be described in greater detail hereinafter, the sealing means 27 for the chamber 14 can be designed and installed between the input and output components of the damper 5 or an equivalent damper in such a way that it acts as a friction generating component or that it assists the action of a primary friction generating component.

Still further, the sealing means 27 or its equivalent can be designed and installed in such a way that it can compensate for wear upon certain constituents of the damper 5 and/or that it reduces the likelihood of noise generation in the engaged or disengaged condition of the lockup clutch 32. The arrangement can be such that the sealing means can serve to compensate for radial and/or axial play between the carriers 11, 12 and the collar or flange 20. In many instances, flexibility of the plate-like member 6 is the cause of undesirable play between two or more parts of the force transmitting apparatus 1 or an equivalent apparatus. The utilization of partially or fully elastic or elastomeric sealing means has been found to be particularly useful in preventing or at least reducing undesirable (stray) movements of various constituents in the force transmitting apparatus 1 or analogous force transmitting apparatus.

The illustrated ball or roller bearing 51 between the output shaft 7 and the wall 4 (i.e., between the receptacle including the carriers 11, 12 and the collar or flange 20) can be replaced by a simpler sleeve bearing or by any other suitable bearing, as long as the constituents of the apparatus 1 are adequately centered relative to each other and/or can turn relative to each other to the extent which is necessary to ensure satisfactory operation of the turbine damper 36 and/or the external damper 5.

The centering stub 57 can be surface hardened or it can carry a cap of hardened material. Furthermore, the surface surrounding the socket 52 of the output shaft 7 can be provided on a layer of highly wear-resistant material.

It is also possible to provide adequate centering means for the housing 2 on the input shaft 25 of the transmission, rather than on the output shaft 7 of the prime mover. This is often desirable and advantageous because the force transmitting apparatus can take full advantage of a rotary torque transmitting arrangement (6, 7) which employs a flexible plate-like torque transmitting member.

FIG. 1 shows that the turbine damper 36 is installed radialy inwardly of the external damper 5. Savings in space (in addition to those achieved by installing the damper 5 in a position radially outwardly of and at least substantially entirely between the two axial ends of the cylindrical external surface 50 of the wall 4) can be achieved by selecting the positions of the springs forming part of the damper 36 in such a way that their axes are located in a plane which includes the axes of the springs 9, 10 of the energy storing component 8 and is normal to the axis of the torque converter 3. Such mounting of the dampers 5, 36 renders it possible to achieve savings in space as considered in the axial as well as in the radial direction of the force transmitting apparatus 1.

The reason for the just discussed savings in space is that the amount of non-utilized space within the confines of the apparatus 1, and especially within the confines of the housing 2, can be reduced well below that which necessarily exists when the housing of the torque converter assumes the customary (standard) shape to receive a substantially toroidal turbine.

The dimensions of the collar or flange 20 and of the wall portion including the surface 50 are or can be selected in such a way that the radially inner portion of the collar 20 is (or can be) directly affixed to the wall 4, e.g., by welding and/or mechanically (by resorting to bolts, rivets, screws or the like). Furthermore, the cylindrical portion of the wall 4 can carry suitable locating means (such as split rings and/or shoulders or external grooves) to properly position the collar 20 and/or one or more other parts of the damper 5 in an optimum axial position.

Figure 6:
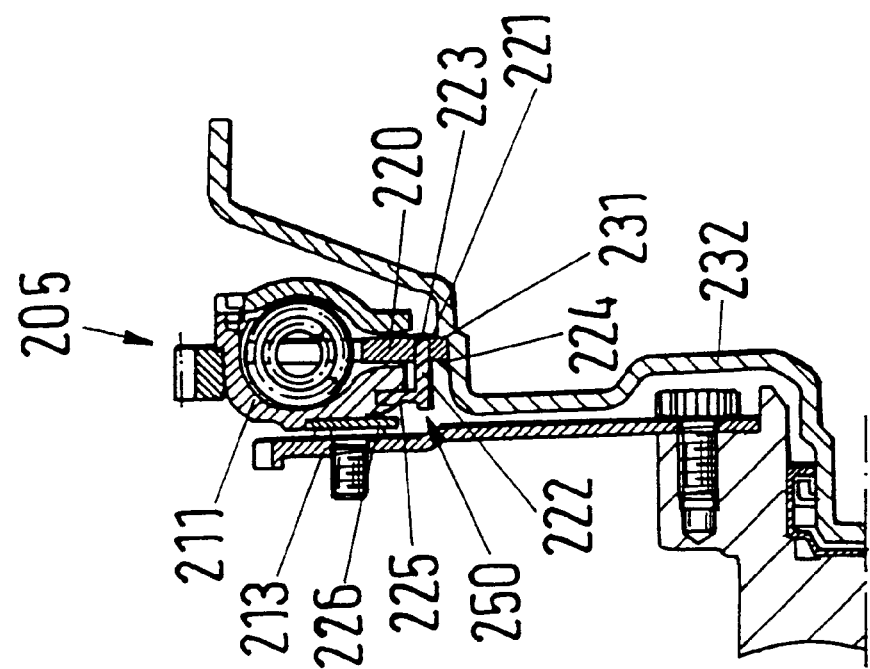
FIG. 6 is a similar fragmentary axial sectional view but showing an external damper constituting a modification of the damper shown in FIG. 5.

Still further, and as will be described in detail with reference to the embodiment which is illustrated in FIG. 6, the external damper can be provided with means for adjusting or regulating the friction generating means of the damper. One or more constituents of such adjusting or regulating means can be provided on or can constitute integral part(s) of the rear wall of the torque converter housing. For example, the adjusting or regulating means can comprise mating gears one of which can be carried by or made of one piece with the cylindrical portion (at the surface 50) of the rear wall 4. By the same token, the collar 20 or an equivalent thereof can form part of the rear wall 4.

In accordance with a modification, the dry friction generating component 28 of the damper 5 can be replaced with or utilized jointly (in parallel or in series) with a suitable wet friction generating system.

The illustrated friction generating component 28 can be designed in such a way that it operates with a clockwise and counterclockwise play of at least 2° or 3°, preferably with a play in the range of between about 2° and 15°. The adjusting or regulating means can include two mating gears or gear teeth (such as a spur gear and an internal gear or two mating short cylindrical gears), one on the collar 20 outside of the chamber 14 and the other on the friction generating member 29. The gear which is carried by the flange 20 can form an integral part of such flange, i.e., one or more gear teeth can be machined into or otherwise formed on or in the part 20. This holds true regardless of whether the tooth or teeth of the gear on the collar or flange 20 extend in the radial or axial direction of the torque converter 3.

Still further, and as will be more fully described hereinafter, the gears of the adjusting or regulating means for the friction generating component 28 of the damper 5 or of an equivalent external damper can include a short cylindrical gear with an annulus of teeth at one of its axial ends, and a complementary second gear constituted by a ring-shaped disc (such as the collar or flange 20) having openings which receive the teeth at one axial end of the cylindrical gear with requisite clearance (as seen in the circumferential direction of the cylindrical gear) so that the two gears can turn relative to each other (e.g., through angles of between about 2° and 15°) in clockwise and counter-clockwise directions starting from a neutral position. An advantage of such adjusting means is that the two mating gears guarantee a satisfactory and long-lasting radial guidance of the mobile parts of the friction generating component relative to each other.

If the adjusting means comprises a spur gear with one or more teeth meshing with the teeth of an internal gear, the spur gear can form part of or it can be affixed to the cylindrical surface 50, and the internal gear can be provided on or it can form part of the collar or flange 20.

The illustrated hydrokinetic torque converter 3 can be replaced with a so-called Föttinger transmission or clutch, e.g., a clutch of the type disclosed in U.S. Pat. No. 3,792,585 granted Feb. 19, 1974 to Eisenmann et al. for "HYDRAULIC COUPLING". The diclosure of this patent, together with the disclosure of the aforementioned published German patent application Ser. No. 42 13 341 and of our priority application Ser. No. 198 06 463.2 (filed Feb. 17, 1998) is incorporated herein by reference.

Figure 2:
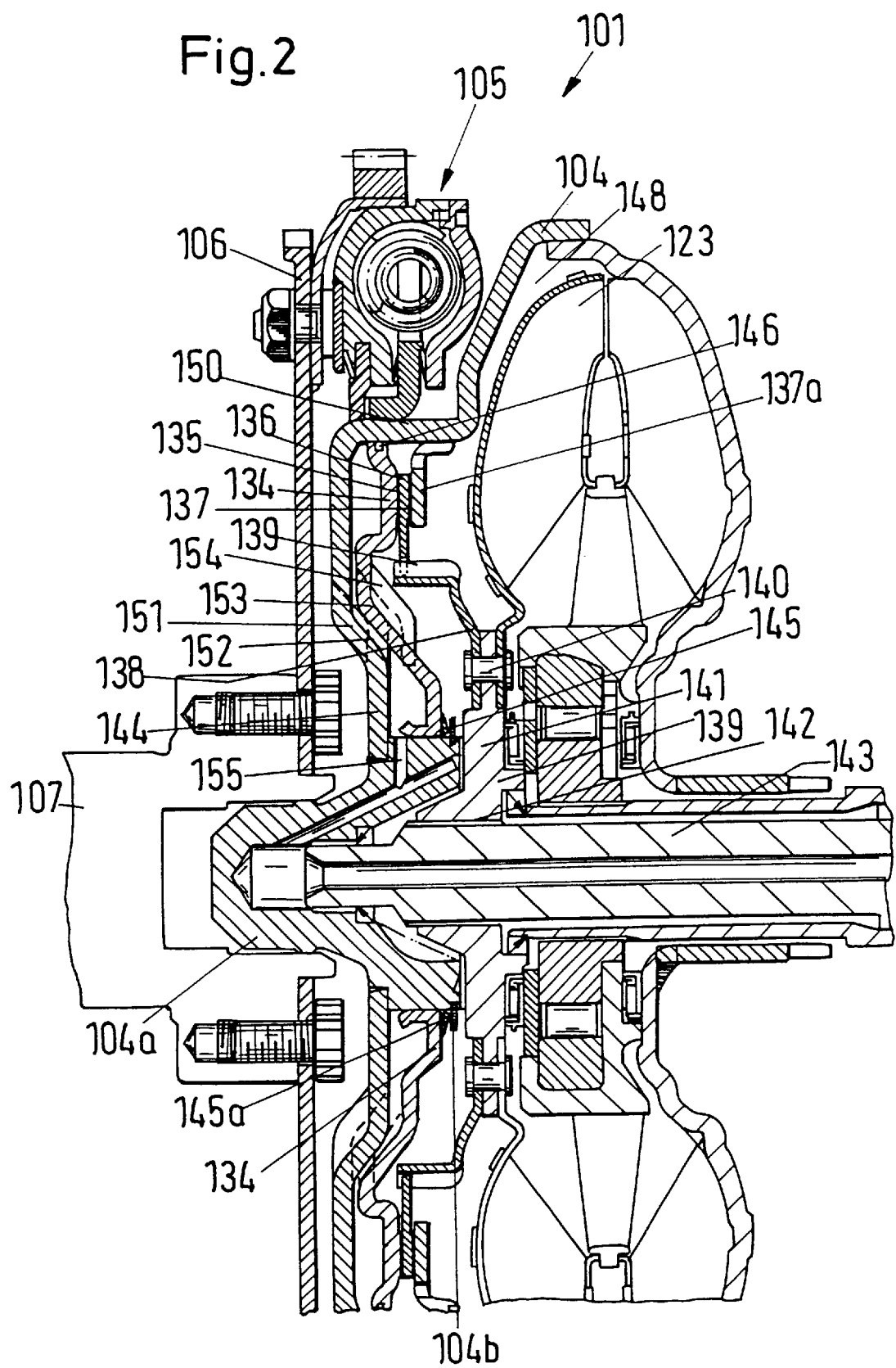
FIG. 2 is a similar fragmentary axial sectional view of a second apparatus which does not employ a turbine damper and wherein the housing of the torque converter can rotate the piston of a lockup clutch in the housing of the torque converter by way of specially designed form-lockingly engageable protuberances.

FIG. 2 shows a force transmitting apparatus 101 which does not employ a turbine damper. The external damper 105 is installed outside of the housing of the hydrokinetic torque converter and is effective also when the lockup or bypass clutch including the piston 134 is engaged, i.e., the damper 105 can absorb or counteract torsional vibrations of the output assembly including the input shaft 143 of the transmission (which normally receives torque from the torque converter) as well as torsional vibrations of the torque transmitting arrangement 106, 107 of the prime mover. The housing of the torque converter of FIG. 2 includes a rear wall 104 which also comprises a cylindrical external surface 150 surrounded by the external damper 105. The rear wall 104 of the housing is further provided with alternating external and internal protuberances 151, 152 which are located radially inwardly of the cylindrical surface 150. The protuberances 151, 152 of the illustrated wall 104 are segmental portions or pockets obtained as a result of deformation of corresponding portions of the wall 104 in a suitable cold forming or shaping machine. The protuberances 151, 152 cooperate with analogous protuberances 153, 154 which are provided on the piston 134 of the lockup clutch in the housing of the torque converter in the apparatus 101 of FIG. 2. The wall 104 and the piston 134 preferably constitute converted blanks of metallic sheet material. The protuberances 153 extend into the hollows at the inner sides of the protuberances 151, and the protuberances 152 extend into the hollows in the adjacent sides of the protuberances 154.

Figure 4:
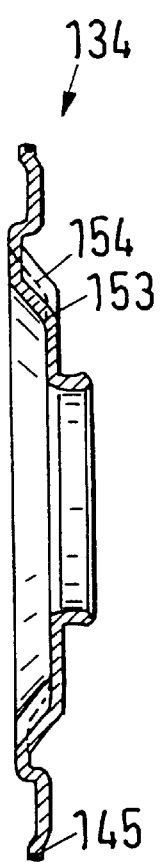
FIG. 4 is a sectional view as seen in the direction of arrows from the line IV—IV in FIG. 3.
Figure 3:
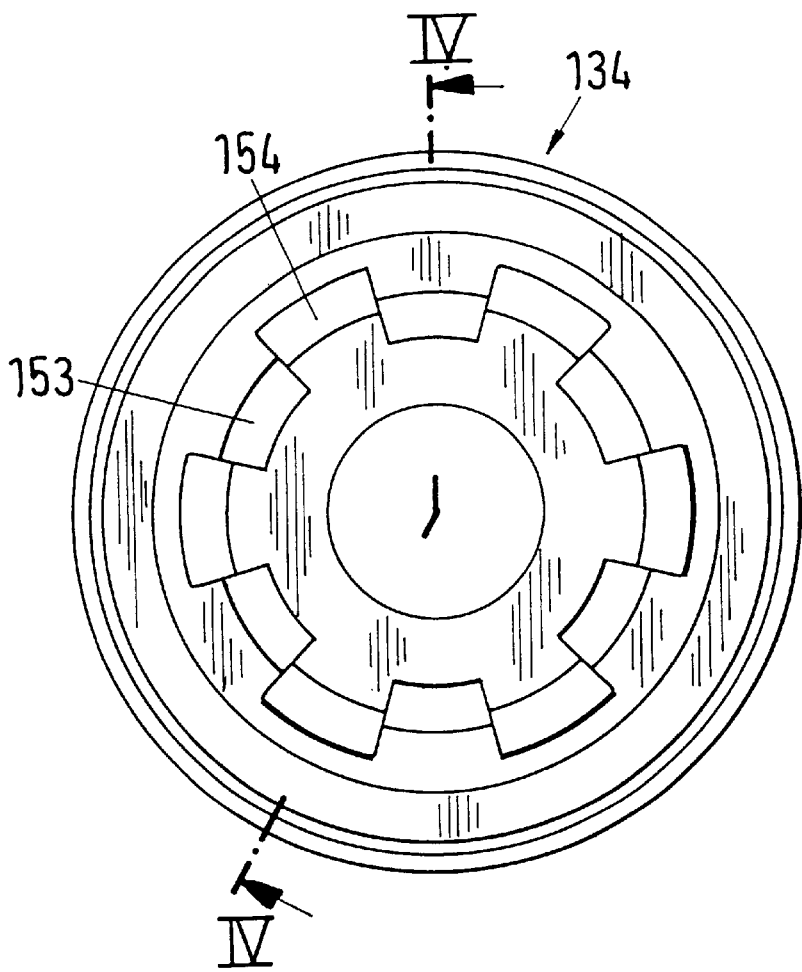
FIG. 3 is an elevational view of the piston of the lockup clutch in the torque converter of the force transmitting apparatus shown in FIG. 2.

The details of a piston 134 which can be utilized in the lockup clutch of the torque converter of the aparatus 101 are shown in FIGS. 3 and 4. That annular portion of the piston 134 which is provided with alternating protuberances 153, 154 (as seen in the circumferential direction of the piston) can be said to exhibit an undulate shape and is in form-locking engagement with that annular portion of the wall 104 which exhibits the protuberances 151, 152. Such form-locking engagement is effective against angular movements of the wall 104 and the piston 134 relative to each other but permits the piston 134 to move axially, i.e., to engage or disengage the lockup clutch.

The carriers for the energy storing component of the damper 105 receive torque from the output shaft 107 of the prime mover by way of the flexible plate 106 and a component corresponding to the member or holder 16 in the apparatus 1 of FIG. 1, and the output element of the damper 105 transmits torque to the wall 104, i.e., to the hydrokinetic torque converter forming part of the force transmitting apparatus 101 and including the housing having the wall 104. The lockup clutch further comprises a clutch disc or clutch plate 135 with friction linings 136, 137. When the lockup clutch is engaged, a radially extending annular portion of the piston 134 bears upon he friction lining 136 to urge the friction lining 137 against a radially inwardly extending annular washer-like member 137a which is welded or otherwise reliably secured to the internal surface of the wall 104 radially inwardly of the cylindrical surface 150.

The clutch disc 135 has internal teeth mating with a spur gear 129 on the annular member 137a which is welded and/or riveted to the turbine 123 of the torque converter in the housing including the wall 104. The clutch disc 135 and its friction linings 136, 137 render it possible to increase the transmissible torque without necessitating a change of the magnitude of the transmitted load.

The transmission of force from the piston 134 of the lockup clutch to the turbine 123 takes place by way of the clutch disc 135 and a flange or collar 138 having a spur gear 139 mating with the internal gear of the clutch disc 135. The flange 138 is fixedly secured to the turbine 123 and to a toothed hub 141 by rivets 140. Such arrangement renders it possible to dispense with a discrete bearing arrangement for the parts 123, 138 on the hub 141 which latter is non-rotatably coupled to the input shaft 143 of the change-speed transmission by complementary internal and external teeth 142.

The piston 134 is movable axially to engage or disengage the lockup clutch (by biasing the friction lining 137 against the annular member 137a or by permitting the friction lining 137 to slip relative to the member 137a) in response to changes of fluid pressure in one (144) of two plenum chambers 144, 148 which flank the piston 134. The chambers 144, 148 are respectively sealed by sealing elements 145, 146. The pressure of fluid (such as oil) in the chamber 144 can be varied by admitting a pressurized fluid into, or by permitting some fluid to escape from, the chamber 144 by way of a conduit, a bore or a like passage 155 provided in a central portion or hub 104a of the wall 104. The fluid pressure in the chamber 148 (this chamber is defined by the housing including the wall 104 and confines the turbine 123, the pump and (if employed) the stator(s) of the torque converter) is less than the pressure in the chamber 144. It will be seen that the just described construction of the apparatus 101 renders it possible to simplify the mounting of the piston 134 and the design of the hub 141 of the turbine 123.

The radially inner portion of the piston 134 is axially movably centered on the hub 104a which is welded or otherwise fixedly secured to the wall 104. The aforementioned annular seal 146 is installed between the radially outermost portion of the piston 134 and the internal surface of the wall 104, and the seal 145 is installed between the radially innermost portion of the piston 134 and the hub 104a.

The piston 134 is biased axially and away from the friction lining 136 of the clutch disc 135 by a diaphragm spring 145a which reacts against an annular retaining member 104b (e.g., a split ring) recessed into the external surface of the hub 104a. The diaphragm spring 145a ensures that the lockup clutch including the piston 134 is disengaged when the pressure of fluid in the chamber 148 exceeds the pressure of fluid in the chamber 144 and in the passage 155. An advantage of the diaphragm spring 145a (which can be replaced by or used jointly with other suitable biasing means) is that it prevents the piston 134 from generating noise (or reduces the noise) when the lockup clutch is disengaged.

The protuberances 151, 152 and 153, 154 extend to one side of an imaginary plane which is normal to the axis of the housing including the wall 104. Some or all protuberances have cavities confronting the neighboring protuberances to ensure that the transmission of torque between the wall 104 and the piston 134 is optimal when the lockup clutch is engaged. The protuberances 151, 152 and 153, 154 preferably form two circumferentially extending annuli of segment-shaped raised hollow portions of the wall 104 and piston 134. The depths and/or other dimensions of the protuberances 151—154 are selected in such a way that the piston 134 is compelled to share the rotary movements of the wall 104 when the lockup clutch is engaged to transmit torque between the housing of the torque converter and the turbine 123 but the piston 134 is still free to perform the required axial movements in order to disengage or reengage the lockup clutch.

The number of protuberances can vary between one on each of the parts 104, 134 and a full set, i.e., a complete annulus of equidistant protuberances. An advantage of complete annuli of protuberances is that the engagement and disengagement of the lockup clutch are smoother and that, at least under certain circumstances, the making of the wall 104 and/or of the piston 134 is simpler than if each such part were provided with a single protuberance.

The operation of the lockup clutch can be rendered noiseless or at least very quiet or reasonably quiet by providing at least some of the confronting and contacting surfaces of the protuberances 151 to 154 with coats or films of a suitable noise-reducing or noise-absorbing material. Suitable materials are certain polymers and lacquers.

The purpose of the biasing means including the annular split ring or retaining ring 104b on the hub 104a of the wall 104 and the energy storing diaphragm spring 145a is to yieldably bias the piston 134 to an axial position in which the lockup clutch is disengaged. This reduces the likelihood of noise generation when the pressure of fluid in the plenum chamber 144 is not higher than that of the fluid in the internal chamber 148, i.e., when the piston 134 is not caused to bear upon the adjacent friction lining 136 of the clutch disc 135. The diaphragm spring 145a can be replaced by or utilized jointly with one or more other resilient elements which can react against the hub 104a or against another portion of the wall 104 to yieldably bias the piston 134 to the axial position corresponding to the disengaged condition of the lockup clutch.

It is often preferred to make the wall 104 and/or the piston 134 in a suitable cold forming machine wherein sheet metal blanks can be converted into parts exhibiting the features of the housing 104 and piston 134.

Figure 5:
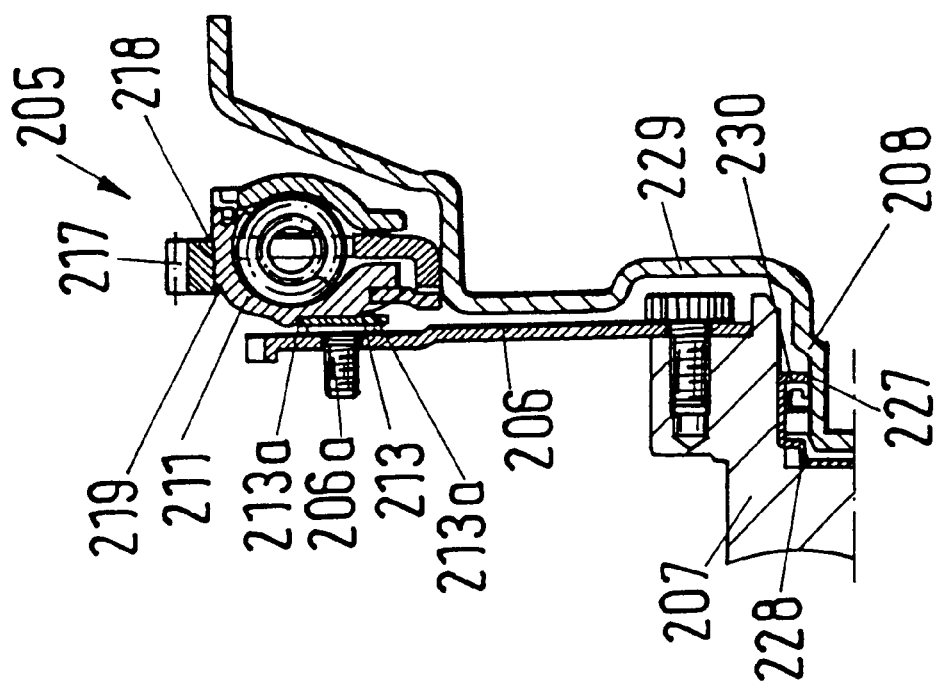
FIG. 5 is a fragmentary axial sectional view of a force transmitting apparatus which employs a modified external damper in the power train between a prime mover and a driven aggregate, such as a change-speed transmission.

FIG. 5 shows a portion of a modified external damper 205. In order to further simplify the construction of the force transmitting apparatus, the component (holder) 16 of FIG. 1 (and the corresponding non-referenced component shown in FIG. 2) is omitted. The plate-like member 213 (corresponding to the member 13 shown in FIG. 1) is welded (at 213a) to threaded fasteners 206a which secure the carrier 211 of the damper 205 to the flexible member 206 of the rotary torque transmitting arrangement further including the shaft 207.

The starter gear 217 abuts directly against a shoulder 218 provided therefor at the exterior of the carrier 211 and is welded to this carrier by spots 219 and/or by one or more arcuate welded seams. Alternatively, the gear 217 can abut a split ring which is recessed into the peripheral surface of the carrier 211 and is deformed into form-locking (torque-transmitting) engagement with the carrier. Other modes of non-rotatably securing the starter gear 217 to the carrier 211 of the damper 205 are equally within the spirit of the present invention.

The rear wall 229 of the housing of the torque converter in the apparatus embodying the structure of FIG. 5 has a centrally located stub 227 extending into a socket of the output shaft 207 of the prime mover. The stub 227 is protected against rapid or excessive wear by a ball or roller bearing 230 and a wear-resistant (e.g., hardened) sleeve 228 surrounding the adjacent (reduced-diameter) portion of the stub. The latter has an external shoulder 208 serving as a stop for the wear-resistant sleeve 228.

The plate-like abutment member 213 (corresponding to the member 13 in the force transmitting apparatus 1 of FIG. 1) is welded (at 213a) to the carrier 211 and/or to the threaded fasteners 206a (one shown) which connect the member 213 to the flexible plate 206.

FIG. 6 shows a portion of a further force transmitting apparatus with a damper 205 which resembles but is not identical with the similarly referenced damper of FIG. 5. In contrast to the flange-like member 20 of FIG. 1, the corresponding member 220 in the damper 205 of FIG. 6 is a plain metallic washer which is welded to the rear wall 232 of the housing of the torque converter by spots 224; these spots can be replaced by rivets, threaded fasteners and/or suitably deformed portions of the member 220. The latter abuts an external shoulder 231 of the cylindrical external surface of the rear wall 232.

The member 220 has windows 221 for the teeth 223 of a friction disc 222, and such teeth are received in the respective windows 221 with a clearance which enables the parts 220 and 222 to turn relative to each other through angles of between about 2° and 15° to both sides of a neutral or central position. That portion of the member 220 which is formed with the windows 221 can be said to constitute a ring-shaped gear mating with the gear including the teeth 223 with the aforementioned clearance in the range of between about 2° and 15° in the clockwise and counterclockwise directions.

The configuration of the friction disc 222 is such that its friction surface 225 extends radially of the common axis of the damper 205 and the torque converter including the wall 232. Such friction surface 225 bears against a complementary radially extending annular surface of the carrier 211. The friction generating component of the damper 205 shown in FIG. 6 further comprises a diaphragm spring 226 which determines the intensity of frictional engagement between the parts 211 and 222. The spring 226 reacts against the abutment member 213.

An advantage of the structure which is shown in FIG. 6 is that it can employ a simpler and less expensive member 220.

The friction disc 222 of the friction generating component 250 of the damper 205 has an L-shaped cross-sectional outline and can be mass-produced at a low cost from a suitable plastic material; alternatively, the disc 222 can include plastic and metallic portions.

In all other respects, the damper 205 of FIG. 6 is or can be identical with the damper of FIG. 5.

FIG. 7 shows an external damper 305 wherein the carrier 311 extends radially inwardly and is axially movably supported by a collar of the output shaft 307 of the prime mover. The carrier 311 is force-lockingly connected to the flexible plate-like member 306 of the torque transmitting arrangement 306, 307 by spot welding, as at 306a, namely by welding it to the fasteners 350 which are secured to the member 306. The abutment member 213 of the damper 205 can be omitted.

The damper 305 is centered relative to the output shaft 307 of the prime mover by a hollow stub 351 forming a central part of the rear wall 304 of the housing of the torque converter carrying the damper 305. An antifriction (ball or roller) bearing 355 is provided between the stub 351 and a friction disc 322. The radially inner portion of the carrier 311 is rigidly connected with an annular centering member 352 which can be made of a metallic sheet material and surrounds the outer race of the bearing 355. The radially outer portion of the centering member 352 is spaced apart from the adjacent portion of the carrier 311 to form with the carrier an annular pocket or recess for the friction disc 322. The friction surface of the friction disc 322 is biased against the radially outermost portion of the centering member 352 by a diaphragm spring 326 which reacts against the carrier 311. It is equally possible to install the spring 326 between the centering member 352 and the friction disc 322 so that the friction surface of the latter bears against the carrier 311.

An insert 354 of the damper 305 shown in FIG. 7 has a substantially L-shaped cross-sectional outline with a radially inwardly extending disc-shaped portion abutting and welded (at 353) to the adjacent radially extending portion of the housing wall 304. The axially extending tubular portion of the insert 354 overlies the cylindrical external surface of the wall 304 radially inwardly of the energy storing component of the damper 305. The insert 354 is or can be of one piece with the friction disc 322, and its radially outwardly extending disc-shaped portion carries a gear with one or more gear teeth mating with the teeth of an internal gear 320a on the flange-like member 320. The two mating gears enable the parts 320, 354 to turn relative to each other, clockwise and counterclockwise, through an angle which, in accordance with a presently preferred embodiment, is in the range of between about 2° and 15°.

An advantage of the embodiment which is shown in FIG. 7 is that the damper 305 is reliably and accurately centered on the wall 304, i.e., on the input shaft (not shown) of the transmission. Thus, the damper 305 is not centered on the torque transmitting arrangement including the output shaft 307 of the prime mover. This ensures that the flexibility of the member 306 is not affected by the aforedescribed centering of the damper 305 on the wall 304. On the other hand, the bearing 51 for the centering stub or pin 57 of the wall 4 shown in FIG. 1 is confined in the socket 51 of the output shaft 7. The reference character 356 denotes in FIG. 7 the axis of the output shaft 307. The bearing 355 is preferably designed and mounted to act as a combined radial and thrust bearing. Any axial movements between the shaft 307 and the damper 305 are taken up by the flexible member 306 of the torque transmitting arrangement.

FIG. 8 shows certain details of a further apparatus with an external damper 405. The sealing elements 426 for the chamber defined by the carriers 411, 412 and containing the energy storing component of the damper are selected in such a way that their sealing action is not affected by eventual axial movements of the wall 404, the flange 420 and the entire force transmitting apparatus relative to the output shaft 407 of the prime mover. Moreover, such selection of the sealing elements 426 ensures that the flexible member 406 can properly perform its intended function such as allowing for desirable axial movements between the shaft 407 and the housing including the wall 404.

The surfaces of the sealing elements 426 lie flush against the adjacent surfaces of the carriers 411, 412 as well as against the adjacent surfaces of the radially outwardly extending disc-shaped portion of the flange 420. Moreover, the effective areas of the sealing surfaces of the elements 426 are much larger than those of the membrane-like sealing elements 27 employed in the apparatus 1 of FIG. 1. Thus, the effective areas extend all the way from the radially inner to the radially outer edges of the sealing elements 426.

The sealing action (compressibility) of the elements 426 can be enhanced by providing their exposed surfaces with radially extending corrugations; this enhances the deformability of the elements 426 in the axial direction of the damper 405 and provides such elements with numerous sealing lips. Still further, and if the elements 426 or their equivalents are subjected to the action of a sufficiently pronounced axial compressing force, they can function not unlike the friction rings of a friction generating component, i.e., they can contribute to the transmission of forces from the input shaft (not shown in FIG. 8) of the transmission which receives torque from the prime mover by way of an apparatus including the structure shown in FIG. 8.

The friction disc 422 of the damper 405 has an annular shoulder 450 which serves as an abutment for the radially innermost portion of the diaphragm spring 426 forming part of the friction generating component. Thus, the shoulder 450 serves as a stop which prevents excessive reduction of the inner diameter of the diaphragm spring 426. Moreover, such shoulder facilitates the assembly of the damper 405.

Alternatively, the friction disc 422 can be provided with an annular shoulder confronting the carrier 411; the diaphragm spring 426 or its equivalent then reacts against the carrier 411 and biases the friction disc 422 directly against the abutment member 413.

Figure 9:
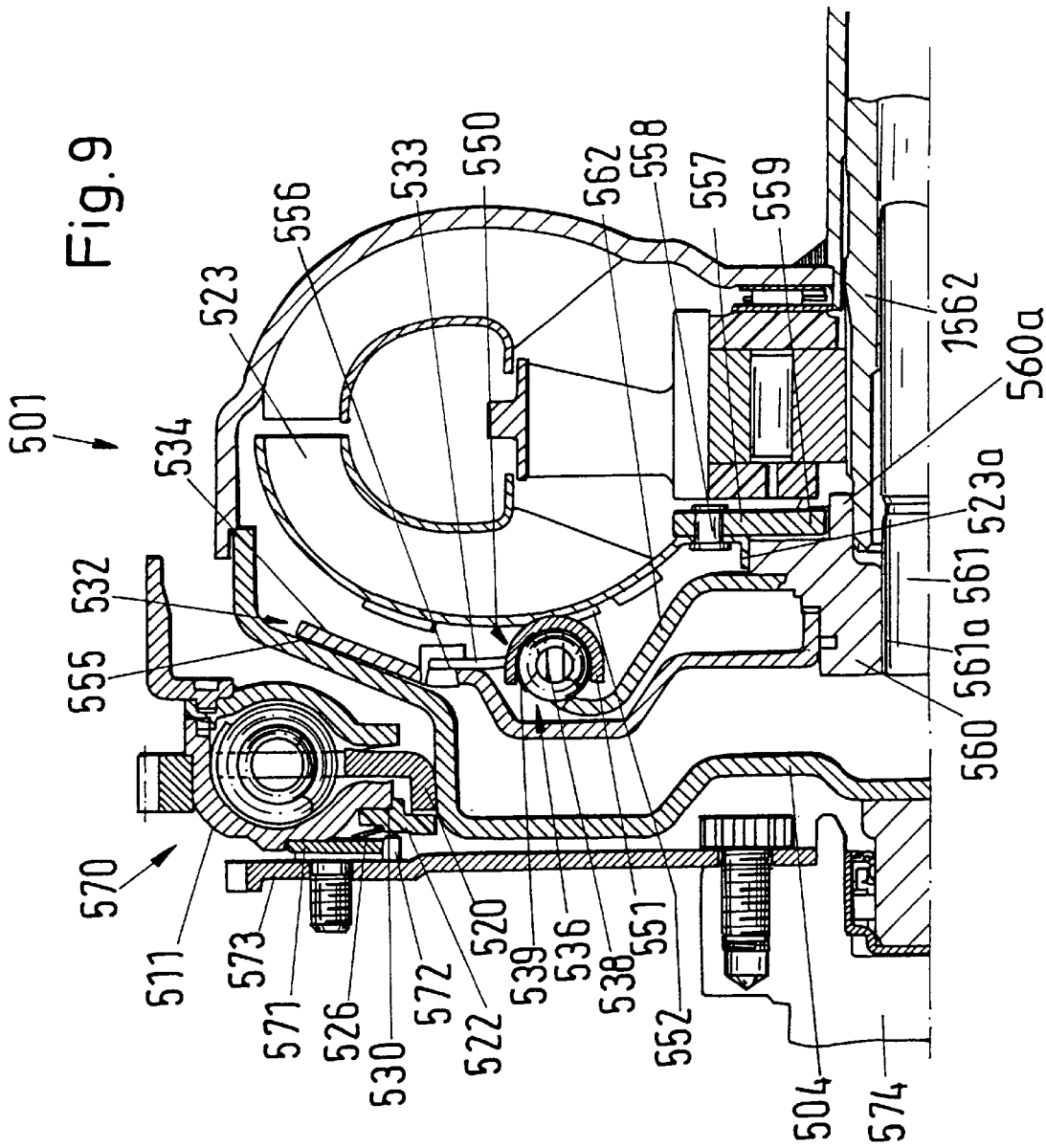
FIG. 9 is a fragmentary axial sectional view of a force transmitting apparatus which is similar to that of FIG. 1 but employs a different turbine damper.

The apparatus 501 of FIG. 9 constitutes a further modification of the force transmitting apparatus 1. The friction disc 522 of the friction generating component of the external damper 570 shown in FIG. 9 differs from the friction disc 422 of FIG. 8 in that it is provided with an axially extending projection 530 which is adjacent the radially innermost portion of the carrier 511. The projection 530 contributes to a reduction of radial play between the friction disc 522, the flange 520 and the carrier 511.

The means for centering the damper 570 on the output shaft 574 of the prime mover (not shown) comprises a disc-shaped or plate-like abutment 571 which is riveted or welded to the carrier 511 and is force-lockingly connected with the flexible plate 573 of the torque transmitting arrangement 573, 574 by threaded fasteners or by welding. The plate 573 is provided with projections 572 in the form of lugs which are bent out of the general plane of the plate 573 and extend radially inwardly of the washer-like abutment 571 to center the abutment with reference to the plate 573; the latter is centered on the shaft 574.

The apparatus 501 further comprises a modified turbine damper 536. This damper constitutes a simplified version of the turbine damper 36 in the force transmitting apparatus 1 of FIG. 1. Thus, the resilient element of the damper 536 comprises one-piece or two-piece coil springs 538 (two-piece coil springs are fitted into each other). In a manner fully shown in FIGS. 10, 11a, 11b, 11c and 11d, the one-piece coil springs 538 are preferably deformed (i.e., caused to assume an arcuate shape) prior to insertion into the casings or shells 550 of the damper 536. Each shell 550 confines a discrete coil spring 538, and the shells are or can be uniformly distributed end-to-end in the circumferential direction of the damper 536. Each shell 550 is a converted sheet metal blank 551 having lugs 552 which secure the respective shell 550 to the turbine 523 of the torque converter in the apparatus 501 of FIG. 9. The blanks 551 further comprise lugs 533 with semicircular recesses 535 for fasteners which secure the shells 550 to the piston 534 of the lockup clutch or bypass clutch 532. The fasteners serve to transmit force from the piston 534 to the shells 550.

Those portions of converted blanks 551 (i.e., of the shells 550) which do not constitute the respective lugs 552, 533 form part of tubular receptacles which extend through about 270° around the respective springs 538 (see FIGS. 11a, 11b and 11c). The springs 538 are partially surrounded by wear-resistant liners 539 made of a suitable hardened metallic sheet material and fitted into the respective shells 550 in such positions that they prevent the establishment of direct contact between the convolutions of the springs 538 and the shells 550 when the springs tend to move radially outwardly under the action of centrifugal force. The hardness of the liners 539 is related to that of the springs 538 in such a way that the extent of wear upon such parts is almost nil or negligible.

FIG. 11d shows that the blanks 531 are deformed at both axial ends of the respective coil springs 538 to limit the extent of expansion of such springs. This enables the output member 562 of the turbine damper 536 to act upon both end convolutions of each coil spring 538.

The shells 550 are or can be welded directly to the turbine 523. The welded connections can be replaced by or utilized jointly with rivets, bolts, screws or other types of fastening means.

When the lockup clutch 532 in the torque converter of the apparatus 501 shown in FIG. 9 is disengaged, the transmission of forces between the output shaft 574 of the prime mover and the input shaft 561 of the change-speed transmission takes place in the following way: The turbine 523, which is secured to a flange 557 by rivets 558 and has a radially innermost tubular portion 523a surrounding and being centered on a hub 560, transmits force to the shells 550 which, in turn, stress the coil springs 538 of the turbine damper 536. The output member 562 of the damper 536 transmits torque to the hub 560 which is non-rotatably but axially movably mounted on the input shaft 561 of the transmission.

The hub 560 has gear teeth 559 which mate, with play, with a gear on the turbine 523. The gear teeth 559 are provided on an axial extension 560a of the hub 560; this contributes to a reduction of the overall axial length of the force transmitting apparatus 501. During disengagement of the lockup clutch 532, the extension 560a slides axially along the external surface of a hollow shaft 1562 which is fixed to the housing.

When the lockup clutch 532 is engaged, the shaft 574 transmits torque to the shaft 561 by way of the rear wall 504 of the housing of the torque converter and the friction linings 555 between the wall 504 and the piston 534 of the clutch 532. The friction linings 555 are or can be provided with suitably distributed and configured channels or grooves or passages for the flow of a coolant. The piston 534 transmits torque to the lugs 533 by way of fasteners 556. The lugs 533 transmit torque to the respective shells 550 and hence to the turbine 523. The turbine 523 transmits torque to the flange 557, and the gear of the flange 557 transmits torque to the gear 559 on the extension 560a of the hub 560 and hence to the input member 562. The turbine damper 536 operates within an angular range which is determined by the angular play of the flange 557. The coil springs 538 of the turbine damper 536 operate within limits imposed by the member 562 which is welded to, mechanically fastened to, or deformed into torque transmitting engagement with the hub 560 and the shells 550 so that one can dispense with an output member corresponding to the member 37 in the apparatus of FIG. 1.

The turbine damper 536 becomes effective as soon as the lockup clutch 532 is engaged, i.e., as soon as the transmission of torque begins to take place directly from the wall 504 to the piston 534 (via friction lining 555), thence to the resilient elements 538 of the damper 536 and (by way of the lugs 552) to the turbine 523, and from the turbine 523 to the shaft 561 via rivets 558, flange 557 and hub 560.

The wear-resistant liners 539 constitute an optional but desirable feature of the force transmitting apparatus 501. These liners render it possible to employ less wear-resistant receptacles or shells 550 and less expensive energy storing elements 538. Each liner 539 can be surface hardened or it can consist of a hardened material.

It is preferred to secure the receptacles 550 to the turbine 523 at a location other than the intermediate portion (at or close to the tips of the lugs 533) where the width of the turbine (as measured in the axial direction of the wall 504) assumes a maximum value. In FIG. 9, the lugs 552 are located between such intermediate portion and the radially innermost portion of the turbine 523. This brings about the advantages that the resilient elements 538 are subjected to less pronounced centrifugal forces and that the turbine clutch 536 can be assembled with savings in material such as the material of the liners 539. Furthermore, the turbine damper 536 contributes less to the axial length of the apparatus 501, i.e., the piston 534 can be placed nearer to the turbine 523.

The turbine damper 536 can be located radially outwardly of the illustrated position, for example, when it is desirable to employ relatively long energy storing elements 538, i.e., when the turbine damper is to take up or at least partially absorb pronounced torsional vibrations while the lockup clutch is engaged.

The turbine damper 536 can be utilized jointly with or in lieu of the external damper 570.

Figure 12:
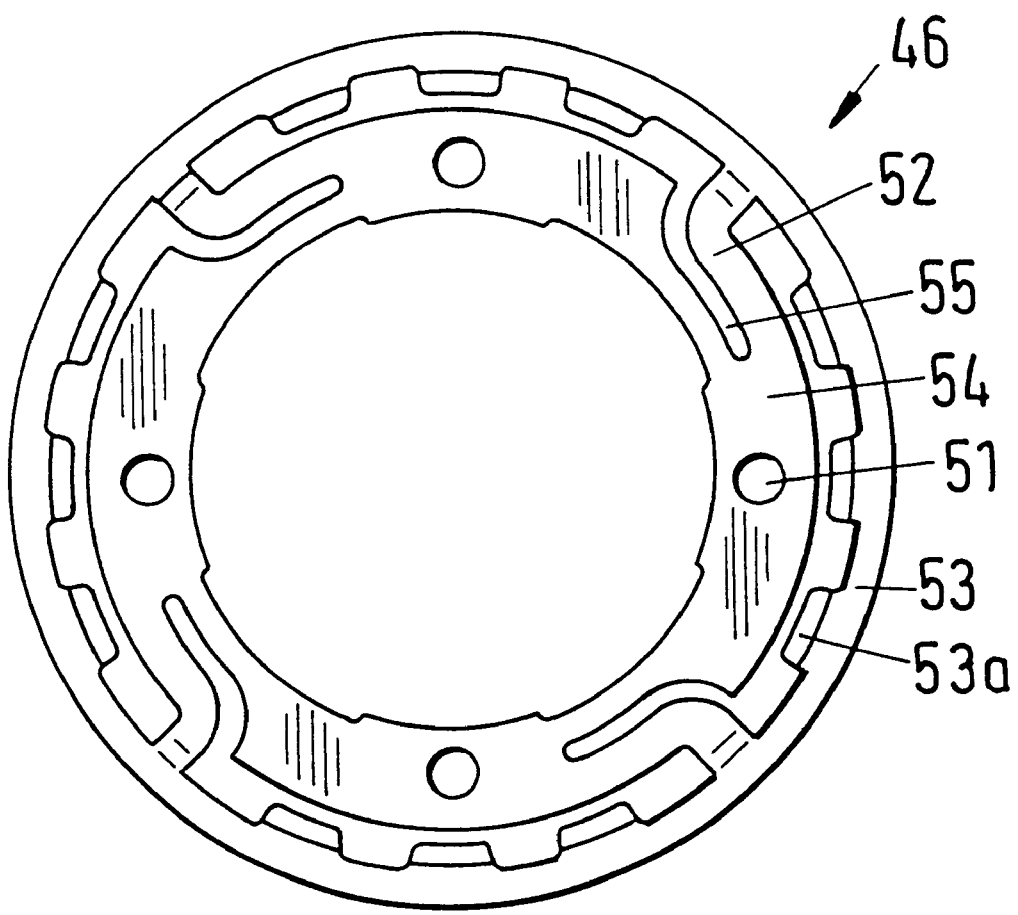
FIG. 12 is an elevational view of a multiple-purpose safety device which can be utilized in the force transmitting apparatus of FIG. 1.

The safety disc 46 of FIG. 1 can be constructed and configured in a manner as shown in FIG. 12. This safety disc performs several functions one of which involves securing the fasteners 45 (shown in FIG. 1) which connect the members 37 and 42 to each other. The fasteners 45 permit a limited angular movement of the members 37 and 42 relative to one another. The extent of such angular movement is limited by suitable stops, e.g., by gear teeth which mate with a certain amount of play.

In order to ensure such limited amount of movability of the members 37 and 42 relative to each other, one of the members 37 and 42 (e.g., the member 42) must be provided with elongated slots 50 (FIG. 1) for the shanks of the fasteners 45. The safety disc 46 has circular openings 51 (FIG. 12) which receive the fasteners 45 without angular play. The dimensions of the slots 50 determine the extent of angular movability of the members 37, 42 relative to each other.

Another function of the safety disc 46 is accomplished in that the disc is enlarged in the radial direction by portions or webs 52 which carry a toothed disc portion 53 having radially inwardly extending teeth 53a. The teeth 53a have a spring factor and exert an axial bias between the safety disc 46 and the piston 34 of the lockup clutch 32. The bias of the disc portion 53 determines the relative axial movements between the turbine damper 36 and the piston 34 of the lockup clutch 32. Otherwise stated, the selected characteristics of the disc portion 53 determine the distance of the turbine damper 36 from the piston 34. Thus, by properly selecting such characteristics of the disc portion 53, one can avoid the generation of noise which could develop if the parts 34 and 36 were free to repeatedly impact against each other.

The safety disc 46 further comprises a radially outer portion which engages a shoulder 54 (FIG. 1) of the piston 34 of the lockup clutch 32. The webs or portions 52 of the safety disc 46 are configured in such a way that they serve to bias the disc portion 53 in the axial direction. However, it is also possible to design the disc 46 in such a way that its portions or webs 52 are rigid, i.e., that they exhibit no resiliency at all or no appreciable resiliency.

In order to more accurately relate the extent of resilient deformability and the spring factor of the safety disc 46 to each other, as well as to increase its radial dimension, the portions or webs 52 are extended in that the shoulder 54 of the piston 34 is provided with grooves 55 disposed radially inwardly of the webs or portions 52 and extending in the circumferential direction of the disc 46.

The safety disc 46 can be utilized with advantage in force transmitting apparatus which employ a turbine damper 36 but can operate without an external damper corresponding to the damper 5 in the apparatus of FIG. 1. As already mentioned above, the feature that this safety disc is connected to the resilient annular portion 53 by resilient portions or webs 52 renders it possible to utilize the safety disc as a means for securing the fasteners 45 as well as a means for (indirectly, namely via member 53 and its teeth 53a) reducing or eliminating noise which could be generated by the piston 34 in the disengaged condition of the lockup clutch 32. The member or portion 53 can be said to constitute or to act as a diaphragm spring. The resiliency and certain other characteristics or parameters of the portions or webs 52 determine the bias of the member 53 upon the piston 34. The configuration of the illustrated portions or webs 52 contributes to a greater range of the member 53 as seen in the axial direction of the lockup clutch 32.

It is further clear that certain features of the force transmitting apparatus 1 of FIG. 1 can be combined with or replaced by certain features of the apparatus which are shown in FIG. 2 to 1id, that the features of the illustrated apparatus can be combined with certain features of conventional force transmitting apparatus, that the housing of the torque converter can receive torque from a prime mover other than an internal combustion engine in the power train of a motor vehicle, and/or that the turbine of the torque converter (be it a hydrokinetic torque converter or a torque converter known as Föttinger coupling) can transmit torque to, or receive torque from, an aggregate other than a manually or automatically shiftable transmission in the power train of a motor vehicle.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of apparatus for transmitting force and, therefore, such adaptations should and are intended to be comprehended within the meaning and range of equivalence of the appended claims.

What is claimed is:

1. A force transmitting apparatus, comprising:
   a torque converter including at least one fluid-containing housing rotatable about a predetermined axis, a pump disposed in and rotatable with said at least one housing, and a turbine disposed in and rotatable with and relative to said at least one housing;
   a rotary torque transmitting arrangement for said at least one housing;
   a rotary output assembly coaxial with said at least one housing and arranged to receive torque from said turbine;
   at least one damper provided in a power flow between said torque transmitting arrangement and said output assembly; and
   a lockup clutch provided in said at least one housing and engageable to transmit torque between a wall of said at least one housing and said turbine, said wall having at least one first protuberance extending in the direction of said axis and said lockup clutch comprising a piston movable in the direction of said axis to engage and disengage the clutch and having at least one second protuberance form-lockingly engaging said at least one first protuberance.

2. The apparatus of claim 1, wherein at least one of said first and second protuberances has a recess receiving at least a portion of the other of said first and second protuberances.

3. The apparatus of claim 1, wherein said wall has a first annulus of circumferentially spaced-apart first protuberances and said piston has a second annulus of circumferentially spaced-apart second protuberances mating with the first protuberances of said first annulus.

4. The apparatus of claim 3, wherein said wall and said piston respectively include alternating external and internal first and second protuberances.

5. The apparatus of claim 3, wherein said protuberances are hollow and extend in the direction of said axis from an imaginary plane which is normal to said axis.

6. The apparatus of claim 1, wherein said protuberances consist of a first material and have confronting surfaces provided with coats of a second material other than said first material.

7. The apparatus of claim 6, wherein said second material is a sound absorbent material.

8. The apparatus of claim 7, wherein said second material is selected from the group consisting of polymers and lacquers.

9. The apparatus of claim 1, wherein said at least one first protuberance comprises an integral portion of said wall.

10. The apparatus of claim 1, wherein said piston is movable in the direction of said axis between first and second positions in which said lockup clutch is respectively engaged and disengaged, said lockup clutch further comprising means for yieldably biasing said piston to said second position.

11. The apparatus of claim 10, wherein said biasing means comprises at least one resilient element which reacts against said wall and bears against said piston.

12. The apparatus of claim 10, wherein said wall includes a hub and said biasing means comprises an annular retainer carried by said hub and a diaphragm spring reacting against said retainer and bearing against said piston.

13. The apparatus of claim 1, wherein
   at least one of said at least one damper is interposed between said wall of said at least one housing and said turbine and includes a plurality of resilient elements and receptacles for said resilient elements, said receptacles being provided on said turbine.

14. The apparatus of claim 13, wherein said receptacles are welded to said turbine.

15. The apparatus of claim 13, wherein said receptacles are riveted to said turbine.

16. The apparatus of claim 13, further comprising wear-resistant liners provided in said receptacles to at least reduce the extent of contact between said resilient elements and the respective receptacles.

17. The apparatus of claim 16, wherein said liners have surface-hardened portions confronting the respective resilient elements.

18. The apparatus of claim 16, wherein said liners consist of a hardened material.

19. The apparatus of claim 13, wherein said lockup clutch is arranged between said wall and said at least one of said at least one damper, and said receptacles include portions affixed to said piston.

20. The apparatus of claim 13, wherein said receptacles include lugs fixed to said turbine.

21. The apparatus of claim 13, wherein said turbine includes a hub arranged to transmit torque between said turbine and said output assembly, said hub including an input member arranged to stress said resilient elements of said damper.

22. The apparatus of claim 21, wherein said output assembly includes a shaft and said hub is non-rotatably mounted on said shaft.

23. The apparatus of claim 13, wherein said turbine includes an intermediate portion having a maximum length in the direction of said axis and said receptacles are provided on a portion of said turbine other than said intermediate portion.

24. The apparatus of claim 1, wherein said piston is movable relative to said at least one housing;

said at least one damper includes a turbine damper operative between said turbine and said output assembly and having at least one energy storing element, means for stressing said at least one energy storing element in response to angular displacement between said turbine damper and said output assembly including input and output members rotatable with and relative to each other, fastener means rotatably connecting said input and output members to each other, a safety member for said fastener means, and a spring connected with said safety member and arranged to oppose at least some movements of said piston relative to said at least one housing.

25. The apparatus of claim 24, wherein said spring includes a diaphragm spring.

26. The apparatus of claim 24, wherein said safety member comprises a disc and said spring surrounds said disc, said disc including portions connected to said spring.

27. The apparatus of claim 26, wherein said portions of said disc are resilient.

28. The apparatus of claim 27, wherein said portions of said disc are arranged to bias said spring in the direction of said axis.

29. The apparatus of claim 26, wherein said portions of said disc include parts extending in a circumferential direction of said spring.

30. The apparatus of claim 24, wherein said torque converter is a hydrokinetic torque converter.

31. The apparatus of claim 30, wherein said hydrokinetic torque converter further comprises at least one stator disposed in said at least one housing between said pump and said turbine.

32. The apparatus of claim 24, wherein said torque converter is a Föttinger coupling.

33. A force transmitting apparatus, comprising:

a torque converter including at least one fluid-containing housing rotatable about a predetermined axis, a pump disposed in and rotatable with said at least one housing, and a turbine disposed in and rotatable with and relative to said at least one housing;

a rotary torque transmitting arrangement for said at least one housing;

a rotary output assembly coaxial with said at least one housing and arranged to receive torque from said turbine;

at least one damper provided in a power flow between said torque transmitting arrangement and said output assembly; and a lockup clutch provided in said at least one housing engageable to transmit torque between a wall of said at least one housing and said turbine, said wall having at least one first protuberance extending in the direction of said axis and said lockup clutch comprising a piston movable in the direction of said axis to engage and disengage the clutch and having at least one second protuberance form-lockingly engaging said at least one first protuberance;

wherein said piston is movable in the direction of said axis between first and second positions in which said lockup clutch is respectively engaged and disengaged, said lockup clutch further comprising means for yieldably biasing said piston to said second position, said wall includes a hub and said biasing means comprises an annular retainer carried by said hub and a diaphragm spring reacting against said retainer and bearing against said piston.

34. A force transmitting apparatus, comprising:

a torque converter including at least one fluid-containing housing rotatable about a predetermined axis, a pump disposed in and rotatable with said at least one housing, and a turbine disposed in and rotatable with and relative to said at least one housing;

a rotary torque transmitting arrangement for said at least one housing;

a rotary output assembly coaxial with said at least one housing and arranged to receive torque from said turbine;

at least one damper provided in a power flow between said torque transmitting arrangement and said output assembly; and a lockup clutch provided in said at least one housing engageable to transmit torque between a wall of said at least one housing and said turbine, said wall having at least one first protuberance integral therewith extending in the direction of said axis and said lockup clutch comprising a piston movable in the direction of said axis to engage and disengage the clutch and having at least one second protuberance integral therewith form-lockingly engaging said at least one first protuberance.

* * * * *